United States Patent
Sato et al.

(10) Patent No.: US 10,558,213 B2
(45) Date of Patent: Feb. 11, 2020

(54) CONTROL SYSTEM FOR AND CONTROL METHOD OF AUTONOMOUS DRIVING VEHICLE

(71) Applicant: Toyota Jidosha Kabushiki Kaisha, Toyota-shi, Aichi-ken (JP)

(72) Inventors: Jun Sato, Susono (JP); Yuma Kawamori, Susono (JP); Keiko Tosaki, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 87 days.

(21) Appl. No.: 15/675,202

(22) Filed: Aug. 11, 2017

(65) Prior Publication Data
US 2018/0046185 A1   Feb. 15, 2018

(30) Foreign Application Priority Data

Aug. 15, 2016 (JP) .................. 2016-159248

(51) Int. Cl.
*G05D 1/00* (2006.01)
*B60W 50/14* (2012.01)
(Continued)

(52) U.S. Cl.
CPC ........... *G05D 1/0061* (2013.01); *B60W 50/14* (2013.01); *B62D 1/286* (2013.01); *G05D 1/0088* (2013.01); *B60W 50/0098* (2013.01); *B60W 50/08* (2013.01); *B60W 50/082* (2013.01); *B60W 50/10* (2013.01); *B60W 50/16* (2013.01); *B60W 2050/143* (2013.01); *B60W 2050/146* (2013.01);
(Continued)

(58) Field of Classification Search
CPC .............. G05D 1/0061; G05D 1/0088; G05D 2201/0213; B60W 50/14; B60W 50/0098; B60W 50/08; B60W 50/082; B60W 50/10; B60W 50/16; B60W 2050/143; B60W 2050/146; B60W 2540/22; B60W 2550/14; B60W 2550/20; B62D 1/286
USPC ......................................................... 701/23
See application file for complete search history.

(56) References Cited

U.S. PATENT DOCUMENTS 5,774,069 A * 6/1998 Tanaka ..................... B60T 7/12
                                                            180/167
8,509,982 B2   8/2013 Montemerlo et al.
(Continued)

FOREIGN PATENT DOCUMENTS

CN         105365823 A    3/2016
DE    10 2012 112 802 A1  6/2014
(Continued)

*Primary Examiner* — Marthe Y Marc-Coleman
(74) *Attorney, Agent, or Firm* — Dinsmore & Shohl LLP (57) ABSTRACT

A control system for an autonomous driving vehicle comprises an operation device configured to be operated by a driver; a notification device configured to give notification to the driver; and an electronic control unit. Autonomous driving is performed. When the driver operates the operation device during autonomous driving, autonomous driving is terminated and vehicle driving is switched to manual driving. Further, when the driver should be requested to terminate autonomous driving during autonomous driving, the notification device is controlled to first notify a request for preparing for manual driving to the driver and then notify a request for terminating autonomous driving to the driver.

12 Claims, 8 Drawing Sheets

(51) Int. Cl.

| | | |
|---|---|---|
| *B62D 1/28* | (2006.01) | |
| *B60W 50/00* | (2006.01) | |
| *B60W 50/08* | (2020.01) | |
| *B60W 50/10* | (2012.01) | |
| *B60W 50/16* | (2020.01) | |

(52) U.S. Cl.
CPC ..... *B60W 2540/22* (2013.01); *B60W 2550/12* (2013.01); *B60W 2550/14* (2013.01); *B60W 2550/20* (2013.01); *G05D 2201/0213* (2013.01)

(56) References Cited

U.S. PATENT DOCUMENTS

| | | | |
|---|---|---|---|
| 8,670,891 | B1 | 3/2014 | Szybalski et al. |
| 8,825,264 | B2 | 9/2014 | Montemerlo et al. |
| 2012/0212353 | A1* | 8/2012 | Fung ............ B60K 28/06 340/905 |
| 2015/0070160 | A1 | 3/2015 | Davidsson et al. |
| 2015/0094899 | A1 | 4/2015 | Hackenberg et al. |
| 2015/0353088 | A1 | 12/2015 | Ishikawa |
| 2016/0041553 | A1 | 2/2016 | Sato et al. |
| 2016/0121907 | A1 | 5/2016 | Otake |
| 2016/0214483 | A1* | 7/2016 | Kleen ............... B60W 50/14 |
| 2016/0214612 | A1 | 7/2016 | Kashiba et al. |
| 2016/0327947 | A1 | 11/2016 | Ishikawa et al. |
| 2017/0075349 | A1 | 3/2017 | Sato et al. |
| 2017/0203770 | A1 | 7/2017 | Kondo |
| 2017/0329328 | A1 | 11/2017 | Horita et al. |
| 2017/0364070 | A1 | 12/2017 | Oba |

FOREIGN PATENT DOCUMENTS

| | | |
|---|---|---|
| DE | 102013219887 A1 | 4/2015 |
| JP | H09161196 A | 6/1997 |
| JP | H10151964 A | 6/1998 |
| JP | 2000337893 A | 12/2000 |
| JP | 2007001475 A | 1/2007 |
| JP | 4019865 B2 | 12/2007 |
| JP | 2011118603 A | 6/2011 |
| JP | 2013-544695 A | 12/2013 |
| JP | 2015-182525 A | 10/2015 |
| JP | 2015-230573 A | 12/2015 |
| JP | 2016038768 A | 3/2016 |
| JP | 2016-115356 A | 6/2016 |
| JP | 2016132421 A | 7/2016 |
| JP | 6298772 B2 | 3/2018 |
| KR | 101736977 B1 | 5/2017 |
| WO | 2010/048611 A1 | 4/2010 |
| WO | 2012/047743 A2 | 4/2012 |
| WO | 2015-115159 A1 | 8/2015 |
| WO | 2016/013325 A1 | 1/2016 |
| WO | 2016/092796 A1 | 6/2016 |
| WO | 2017/022417 A1 | 2/2017 |
| WO | 2017/085981 A1 | 5/2017 |

* cited by examiner

| FACTOR | DEGREE OF DIFFICULTY OF MANUAL DRIVING:LOW | DEGREE OF DIFFICULTY OF MANUAL DRIVING:HIGH |
|---|---|---|
| SHAPE OF ROAD | STRAIGHT, WIDE | CURVED, NARROW |
| WEATHER | CLEAR, CLOUDY | RAIN, FOG, SNOW |
| TRAFFIC ACCIDENTS | NO | YES |
| DRIVING EXPERIENCE | YES | NO |

CONTROL SYSTEM FOR AND CONTROL METHOD OF AUTONOMOUS DRIVING VEHICLE

CROSS-REFERENCE TO RELATED APPLICATION

This application claims the benefit of priority of Japanese application No. 2016-159248 filed Aug. 15, 2016, the entire disclosure of which is incorporated by reference herein.

BACKGROUND

1. Technical Field

The present disclosure relates to a control system for and control method of an autonomous driving vehicle.

2. Related Art

An autonomous driving vehicle is known in the art, which gives notification to a driver if the vehicle approaches an area where autonomous driving may be difficult (for example, see Japanese Patent Publication No. 2013-544695A). In one example, the vehicle requests control of steering, acceleration, deceleration, etc. to the driver.

SUMMARY

However, when, for example, autonomous driving is performed over a relatively long time period, if termination of autonomous driving, that is, manual driving, is requested to the driver, the driver may be unable to quickly terminate autonomous driving and start manual driving. On this point, this problem may be solved if continuously requesting termination of autonomous driving to the driver from considerably before the vehicle reaches a point where the driver should terminate autonomous driving or start manual driving. However, in this case, the driver may feel bothered.

According to one embodiment of the present disclosure, there is provided a control system for an autonomous driving vehicle, comprising: an operation device configured to be operated by a driver; a notification device configured to give notification to the driver; and an electronic control unit comprising: a driving control part configured to perform autonomous driving, and to terminate autonomous driving and switch vehicle driving to manual driving when the driver operates the operation device during autonomous driving; and a notification control part configured to control the notification device to first notify a request for preparing for manual driving to the driver and then notify a request for terminating autonomous driving to the driver when the driver should be requested to terminate autonomous driving during autonomous driving.

According to another embodiment of the present disclosure, there is provided a control method of an autonomous driving vehicle comprising: an operation device configured to be operated by a driver; a notification device configured to give notification to the driver; and an electronic control unit, the control method including a step of performing autonomous driving, and terminating autonomous driving and switching vehicle driving to manual driving when the driver operates the operation device during autonomous driving, using the electronic control unit, the control method further including a step of controlling the notification device to first notify a request for preparing for manual driving to the driver and then notify a request for terminating autonomous driving to the driver when the driver should be requested to terminate autonomous driving during autonomous driving, using the electronic control unit.

The present disclosure may be more fully understood from the description of the preferred embodiments according to the present disclosure as set forth below, together with the accompanying drawings.

DESCRIPTION OF THE PREFERRED EMBODIMENTS

Figure 1:
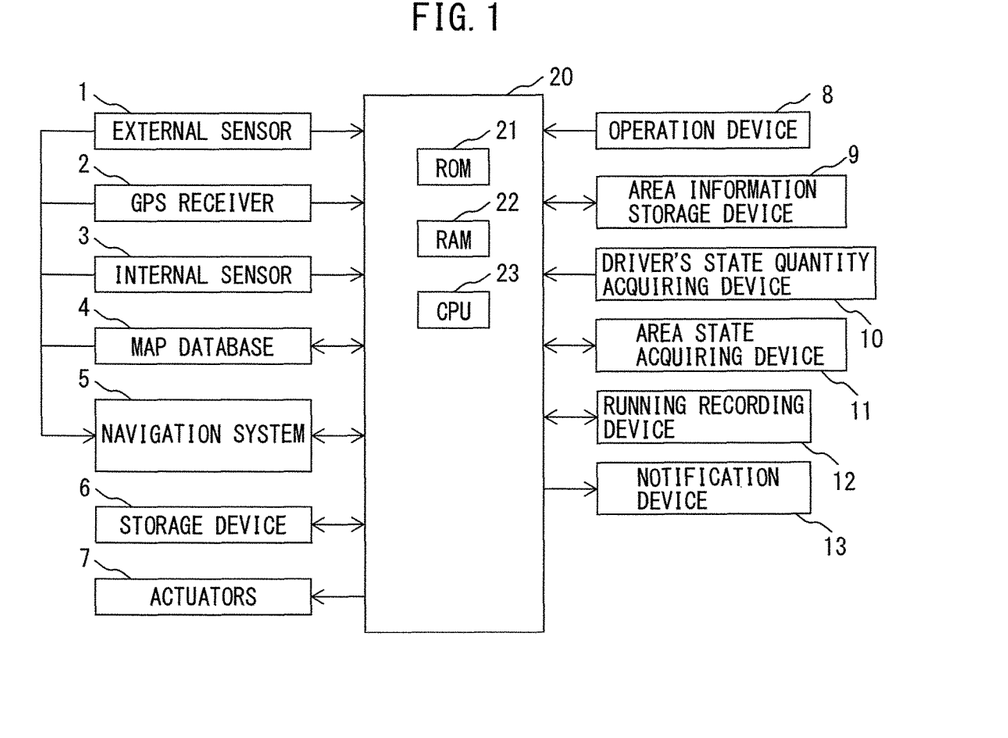
FIG. 1 is a block diagram of a control system for an autonomous driving vehicle of an embodiment according to the present disclosure.

FIG. 1 is a block diagram of a control system for an autonomous driving vehicle of an embodiment according to the present disclosure. Referring to FIG. 1, the control system for an autonomous driving vehicle of the embodiment according to the present disclosure is provided with an external sensor 1, GPS receiver 2, internal sensor 3, map database 4, navigation system 5, storage device 6, various actuators 7, operation device 8, area information storage device 9, driver's state quantity acquiring device 10, area state acquiring device 11, running recording device 12, notification device 13, and electronic control unit (ECU) 20.

Figure 2:
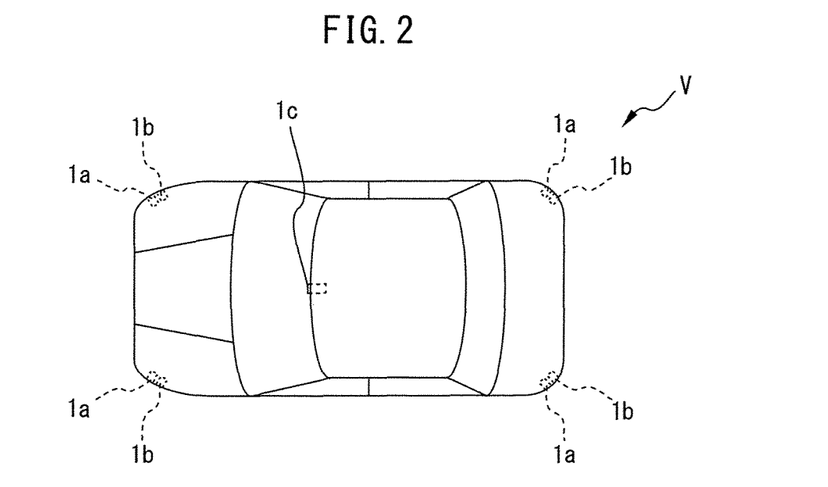
FIG. 2 is a schematic view for explaining an external sensor of an embodiment according to the present disclosure.

The external sensor 1 is configured to detect information at an outside or surroundings of a host vehicle. The external sensor 1 is provided with at least one of a LIDAR (Laser Imaging Detection and Ranging), radar, and camera. In the embodiment according to the present disclosure, as shown in FIG. 2, the external sensor 1 is provided with LIDARs 1a, radars 1b, and camera 1c.

The LIDAR 1a is a device for detecting a road over which the host vehicle is running or outside obstacles, using laser beams. In the example shown in FIG. 2, four LIDARs 1a are respectively attached to bumpers at four corners of the vehicle V. The LIDARs 1a successively fire laser beams toward the surroundings of the host vehicle V and measure distances to the road and obstacles around the road from reflected light to detect the road and obstacles around the host vehicle V in the form of a 3D image. The 3D image of the road and obstacles detected by the LIDARs 1a is transmitted to the electronic control unit 20. On the other hand, the radar 1b is a device for detecting obstacles outside the host vehicle V, using electromagnetic waves. In the example shown in FIG. 2, four radars 1b are attached to the bumpers at the four corners of the vehicle V. The radars 1b emit electromagnetic waves from the radars 1b to the surroundings of the host vehicle V and measures distances to the obstacles in the surroundings of the host vehicle V from reflected waves. The obstacle information detected by the radars 1b is sent to the electronic control unit 20. The camera 1c, in the example shown in FIG. 2, is provided with a front camera provided at an inside of a front glass of the vehicle V. The front camera 1c captures a color or monochrome image of the front of the host vehicle V. The color or monochrome image information obtained by the front camera 1c is transmitted to the electronic control unit 20.

The GPS receiver 2 is configured to receive signals from three or more GPS satellites to thereby detect an absolute position of the host vehicle V (for example, the latitude and longitude of the host vehicle V). The absolute position information of the host vehicle V detected by the GPS receiver 2 is transmitted to the electronic control unit 20.

The internal sensor 3 is configured to detect running condition of the vehicle V. The running condition of the host vehicle V is expressed by at least one of speed, acceleration, and posture of the host vehicle. The internal sensor 3 is provided with one or both of a vehicle speed sensor and IMU (inertial measurement unit). In the embodiment according to the present disclosure, the internal sensor 3 is provided with a vehicle speed sensor and IMU. The vehicle speed sensor detects a speed of the host vehicle V. The IMU is provided with, for example, a three-axis gyro and a 3-direction acceleration sensor, detects a 3D angular speed and acceleration of the host vehicle V, and detects the acceleration and posture of the vehicle V based on these. The running condition information of the vehicle V detected by the internal sensor 3 is transmitted to the electronic control unit 20.

The map database 4 is a database relating to map information. This map database 4 is stored in, for example, an HDD (hard disk drive) mounted in the vehicle. The map information includes, for example, position information of roads and information on road shapes (for example, road width, curved or straight, curvature of curves, positions of intersections, merging points, and branching points etc.)

The navigation system 5 is configured to guide the host vehicle V to a destination input by the driver of the host vehicle V to the navigation system 5. This navigation system 5 calculates a target route up to the destination based on the current position information of the host vehicle V detected by the GPS receiver 2 and the map information of the map database 4. The information of the target route of the host vehicle V is transmitted to the electronic control unit 20.

The storage device 6 stores a road map specially designed for autonomous driving prepared based on the 3D images of obstacles detected by the LIDARs 1a and the results of detection by the LIDARs 1a. The 3D images of the obstacles and road map are constantly or periodically updated.

The actuators 7 are devices for controlling running operations of the host vehicle V in accordance with control signals from the electronic control unit 20. The running operations of the vehicle V include powering, braking, and steering of the vehicle V. The actuators 7 include at least one of a powering actuator, braking actuator, and steering actuator. In the embodiment according to the present disclosure, the actuators 7 include a powering actuator, braking actuator, and steering actuator. The powering actuator controls an output of an engine or electric motor providing drive power of the vehicle V and thereby controls a powering operation of the vehicle V. The braking actuator operates a braking system of the vehicle V and thereby controls a braking operation of the vehicle V. The steering actuator operates a steering system of the vehicle V and thereby controls a steering operation of the vehicle V.

The operation device 8 is configured to be operated by the driver of the vehicle. The operation device 8 is provided with, for example, at least one of a control button, switch, lever, touch panel, voice recognition device (microphone), steering wheel, accelerator pedal, and brake pedal. In the example shown in FIG. 3, the operation device 8 is provided with an operating button 8a. Further, in the example shown in FIG. 3, the operating button 8a is arranged on the steering wheel STR. A signal indicating that the operation device 8 has been operated is sent to the electronic control unit 20.

The area information storage device 9 is configured to store at least one of position information of areas appropriate for autonomous driving and position information of areas inappropriate for autonomous driving. The areas appropriate for autonomous driving and areas inappropriate for autonomous driving will be explained later.

The driver's state quantity acquiring device 10 is configured to acquire a state quantity of the driver. The state quantity of the driver is expressed by, for example, at least one of a degree of awakeness of the driver, trend in gaze allocation of the driver, and a duration time of autonomous driving. The degree of awakeness of the driver is expressed by, for example, a frequency of blinking of the driver, a time during which the eyelids are closed, etc. For example, when the frequency of blinking is high, compared with when the frequency of blinking is low, the degree of awakeness of the driver is high. The trend in gaze allocation of the driver is expressed by, for example, ratios of a time during which the gaze of the driver is directed to the front at the outside of the vehicle, a time during which the gaze of the driver is directed to the side at the outside of the vehicle, and a time during which the gaze of the driver is directed to the rear at the outside of the vehicle and a time during which the gaze of the driver is directed to the inside of the vehicle. The autonomous driving duration time is a time period during which autonomous driving continues in autonomous driving. In a case where the state quantity of the driver is expressed by the degree of awakeness of the driver or the trend in gaze allocation of the driver, the driver's state quantity acquiring device 10 is provided with, for example, a driver camera attached inside of the vehicle V so as to face the driver. In a case where the state quantity of the driver is expressed by the duration time of autonomous driving, the driver's state quantity acquiring device 10 is provided with a timer. The information relating to the state quantity of the driver acquired by the driver's state quantity acquiring device 10 is sent to the electronic control unit 20.

Figure 3:
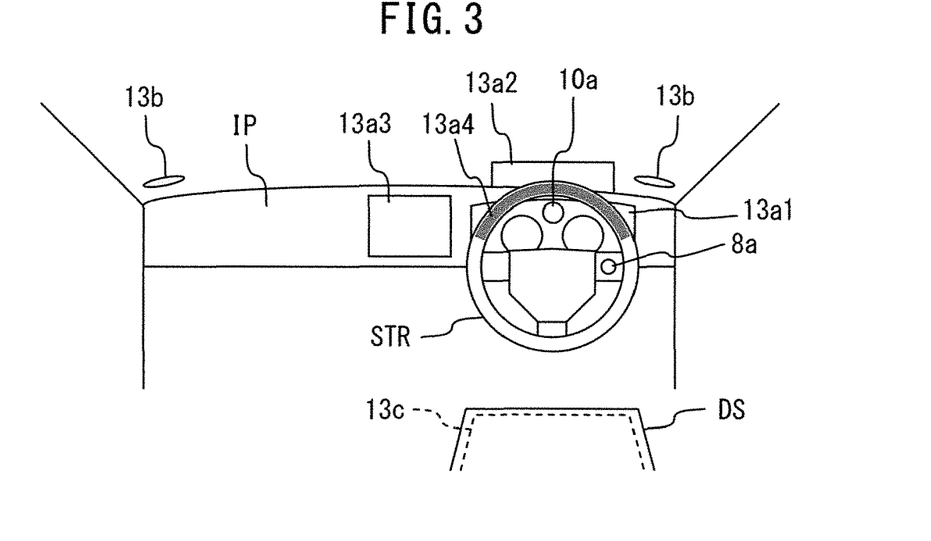
FIG. 3 is a view showing a passenger cabin of an embodiment according to the present disclosure.

In the embodiment according to the present disclosure, as shown in FIG. 3, the driver's state quantity acquiring device 10 is provided with a driver camera 10a attached to an instrument panel IP of the vehicle V so as to face the driver.

The area state acquiring device 11 is configured to acquire information relating to state of an area inappropriate for autonomous driving. The state of an area inappropriate for autonomous driving is expressed by, for example, at least one of weather information (for example, any of a clear sky, cloudiness, rain, fog, or snow or an amount of rainfall, amount of snowfall, degree of fog, wind speed, etc.) and traffic information (for example, existence of any traffic accidents, degree of congestion, etc.) in the areas inappropriate for autonomous driving in question. In the embodiment according to the present disclosure, the area state acquiring device 11 is provided with, for example, an information receiving device and receives weather information, traffic information, etc. sent from outside the vehicle. The information relating to the state of an area inappropriate for autonomous driving acquired by the area state acquiring device 11 is transmitted to the electronic control unit 20.

The running recording device 12 is configured to store running record of the vehicle V. The running record of the vehicle V includes whether the vehicle V has run on a certain road, the number of times the vehicle V has run on a certain road, etc. The running record of the vehicle V is transmitted to the electronic control unit 20.

The notification device 13 is configured to give notification to the driver. This notification includes at least one of, for example, visual notification, audio notification, and bodily sensation notification. In a case where the notification is visual notification, the notification device 13 is provided with a displaying device which the driver can view. The displaying device is provided with at least one of, for example, a display, lamp, etc. The display includes, for example, a meter display 13a1 provided at an instrument panel IP behind a steering wheel STR, a heads up display 13a2 provided at the instrument panel IP above the meter display 13a1, a center display 13a3 provide at the instrument panel IP at the substantial center in a vehicle width direction, etc., as shown in FIG. 3. The meter display 13a1 displays, for example, a vehicle speed, engine speed, remaining fuel amount, remaining battery power, etc. The center display 13a3 is used for the navigation system 5 to display the target route and display guidance to the destination ("turn left at the next intersection" etc.) In a case where the notification device 13 is provided with a display, the notification device 13 displays text information or image information on the display to give notification to the driver. On the other hand, the lamp includes, for example, an LED (Light Emitting Diode) 13a4 attached to the steering wheel STR, as shown in FIG. 3. In a case where the notification device 13 is provided with a lamp, the notification device 13 turns the lamp on or flashes the lamp to give notification to the driver.

On the other hand, in a case where the notification is an audio notification, the notification device 13 is provided with a speaker, for example. The speaker includes, for example, a pair of speakers 13b provided at a top part of the instrument panel IP, as shown in FIG. 3. In a case where the notification device 13 is provided with speakers, the notification device 13 emits at least one of a voice and audio alarm from the speakers to give notification to the driver.

In a case where the notification is a bodily sensation notification, the notification device 13 is provided with, for example, a vibrator giving vibration to the driver. The vibrator includes, for example, a vibrator 13c built into a driver's seat DS, as shown in FIG. 3. In a case where the notification device 13 is provided with a vibrator, the notification device 13 makes the vibrator operate to give notification to the driver.

In the embodiment according to the present disclosure, the notification device 13 is provided with at least one of the meter display 13a1, heads-up display 13a2, center display 13a3, steering STR LED 13a4, speakers 13b, and vibrator 13c. The notification device 13 is controlled based on a control signal from the electronic control unit 20.

Figure 4:
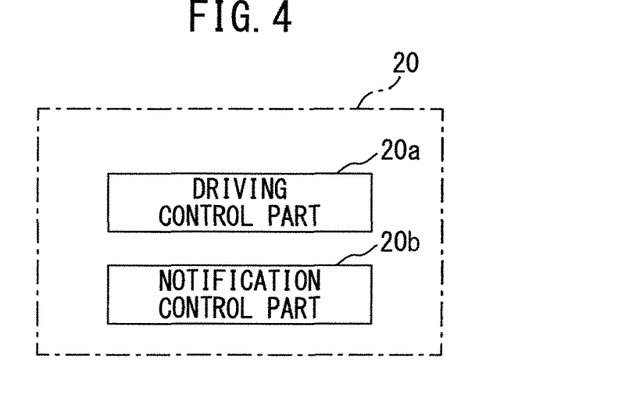
FIG. 4 is a block diagram showing function of an electronic control unit of an embodiment according to the present disclosure.

The electronic control unit 20 is a computer provided with components connected with each other by a bidirectional bus such as a ROM (read only memory) 21, RAM (random access memory) 22, CPU (central processing unit) 23, etc. FIG. 4 is a block diagram showing function of the electronic control unit 20 of the embodiment according to the present disclosure. In the embodiment according to the present disclosure, the electronic control unit 20 is provided with a driving control part 20a and a notification control part 20b. The functions of driving control part 20a and the notification control part 20b are achieved by the ROM 21, RAM 22, CPU 23, etc. The driving control part 20a and the notification control part 20b will be explained later.

In the embodiment according to the present disclosure, an area in which the vehicle V can run are divided into areas adapted or appropriate for autonomous driving, and areas not adapted or inappropriate for autonomous driving. The areas inappropriate for autonomous driving include, for example, locations where roads merge, locations where roads split, locations with construction work, etc. Note that, in the embodiment according to the present disclosure, the area information storage device 9 stores position information of the areas inappropriate for autonomous driving, but does not store position information of the areas appropriate for autonomous driving. The areas appropriate for autonomous driving are identified as areas other than the areas inappropriate for autonomous driving. In another embodiment (not shown), the area information storage device 9 stores only position information of the areas appropriate for autonomous driving. In this case, the areas inappropriate for autonomous driving are identified as areas other than the areas appropriate for autonomous driving. In still another embodiment (not shown), the area information storage device 9 stores position information of the areas inappropriate for autonomous driving and position information of the areas appropriate for autonomous driving.

Figure 5:
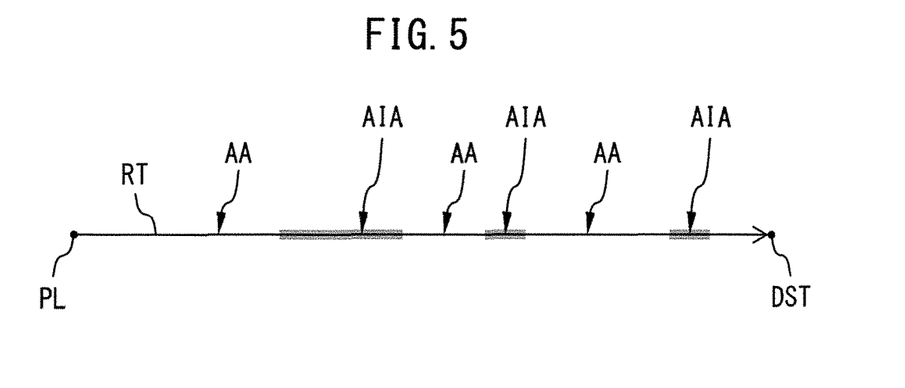
FIG. 5 is a schematic view of one example of a target route.

FIG. 5 schematically shows one example of a target route RT from a present location PL of the vehicle V to a destination DST. In the example shown in FIG. 5, on the target route RT, areas appropriate for autonomous driving AA and areas inappropriate for autonomous driving AIA are scattered. Therefore, if the vehicle V runs along the target route RT, there will be cases where the vehicle V runs through the areas appropriate for autonomous driving AA and cases where it runs through the areas inappropriate for autonomous driving AIA.

Now then, in the embodiment according to the present disclosure, the notification control part 20b judges during manual driving if autonomous driving is possible. For example, if the vehicle V is in the area appropriate for autonomous driving AA and an external state of the vehicle V can be reliably detected by the external sensor 1, it is judged that autonomous driving is possible. As opposed to this, if the vehicle V is in the area inappropriate for autonomous driving AIA or the external state of the vehicle V cannot be reliably detected by the external sensor 1, it is not judged that autonomous driving is possible. If the notification control part 20b judges that autonomous driving is possible, the notification control part 20b controls the notification device 13 to notify the driver that autonomous driving is possible. Next, if the driver operates the operation device 8, the driving control part 20a starts autonomous driving. That is, running operations of the vehicle V, that is, powering, braking, and steering, are controlled by the actuators 7. On the other hand, if the driver operates the operation device 8 during autonomous driving, the driving control part 20a terminates autonomous driving and switches the vehicle driving from autonomous driving to manual driving. In this case, the running operations of the vehicle V, that is, the powering, braking, and steering, are performed by the driver.

Note that, in a case where the operation device 8 is provided with the operating button 8a, an operation for terminating autonomous driving is a pushing down of the operating button 8a by the driver during autonomous driving. Alternatively, in a case where the operation device 8 is provided with the steering wheel, the operation for terminating autonomous driving is an operation of the steering wheel by the driver by a predetermined threshold amount or more during autonomous driving. In a case where the operation device 8 is provided with the accelerator pedal, the operation for terminating autonomous driving is a depression of the accelerator pedal by the driver by a predetermined threshold amount or more during autonomous driving. In a case where the operation device 8 is provided with the brake pedal, the operation for terminating autonomous driving is a depression of the brake pedal by the driver by a predetermined threshold amount or more during autonomous driving.

In the area inappropriate for autonomous driving AIA, it is preferable to perform manual driving. Thus, in the embodiment according to the present disclosure, when the vehicle V approaches the area inappropriate for autonomous driving AIA on the target route RT, the notification control part 20b controls the notification device 13 during autonomous driving to notify the driver of a request for terminating autonomous driving. That is, the driver is requested to operate the operation device 8 to terminate the autonomous driving. This will be explained further with reference to FIG. 6. Note that, in the embodiment according to the present disclosure, if a time period required for the vehicle V to reach an area inappropriate for autonomous driving AIA is equal to or shorter than a predetermined set time period, it is judged that the vehicle V has approached the area inappropriate for autonomous driving AIA, while if the required time period is longer than the set time period, it is not judged that the vehicle V has approached the area inappropriate for autonomous driving AIA.

Figure 6:
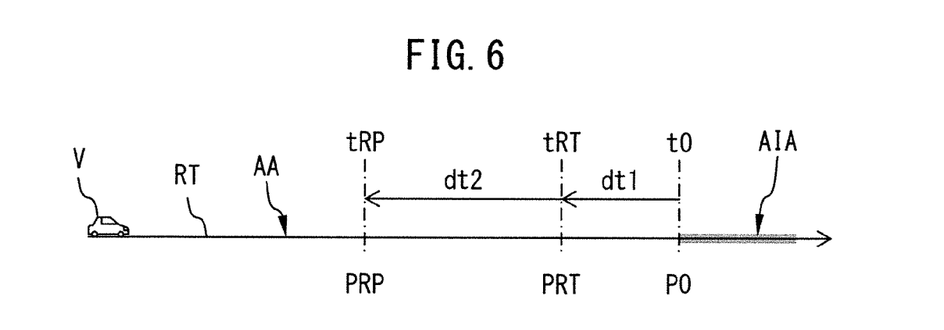
FIG. 6 is a schematic view of a running condition of a vehicle in an embodiment according to the present disclosure.

FIG. 6 schematically shows a state in which the vehicle V is running along a target route RT through an area appropriate for autonomous driving AA with autonomous driving. In FIG. 6, t0 shows a timing at which the vehicle V reaches an area inappropriate for autonomous driving AIA, while P0 shows a starting position of the area inappropriate for autonomous driving AIA. In the embodiment according to the present disclosure, the notification control part 20b sets a timing tRT a predetermined first interval dt1 (for example, a constant value) before the timing t0 at which the vehicle V will reach the area inappropriate for autonomous driving AIA, as a notification timing for termination request, and notifies a request for terminating autonomous driving to the driver when the notification timing for termination request tRT has arrived. In other words, when the vehicle V arrives at a position PRT corresponding to the notification timing for termination request tRT, the notification control part 20b notifies the request for terminating autonomous driving to the driver. Note that, the arrival timing t0 is calculated from a distance from the present position of the vehicle V to the starting position P0 of the area inappropriate for autonomous driving AIA and a speed of the vehicle V.

The request for terminating autonomous driving is notified, for example, as in the following manner. That is, in one example, the display such as the meter display 13a1, heads up display 13a2, or center display 13a3 displays the text information such as "please terminate autonomous driving". In another example, the speakers 13b are made to emit voice information such as "please terminate autonomous driving". In still another example, the above text information and voice information are given to the driver overlappingly. Providing notification to the driver using a plurality of items of the notification device 13 in this way enables the driver to understand or recognize a notification more surely.

Further, the request for terminating autonomous driving is notified, in one example, from when the notification timing for termination request tRT arrives to when the operation device 8 is operated by the driver. In another example, the request for terminating autonomous driving is notified from when the notification timing for termination request tRT arrives to when a predetermined constant time period elapses.

If the driver operates the operation device 8 during autonomous driving, as explained above, the autonomous driving is terminated and manual driving is started. On the other hand, in the embodiment according to the present disclosure, if the driver does not operate the operation device 8 despite the request for terminating autonomous driving is notified to the driver, the driving control part 20a performs processing for stopping the vehicle V. Specifically, the vehicle V is automatically stopped at, for example, a road shoulder. This enables the vehicle V to be evacuated reliably in a case where, for example, the driver has lost consciousness and therefore cannot operate the operation device 8.

In this regard, as explained at the beginning of this specification, when a request for terminating autonomous driving is notified to the driver, the driver may be unable to quickly terminate autonomous driving and start manual driving.

Therefore, in the embodiment according to the present disclosure, further, when the notification control part 20b should notify a request for terminating autonomous driving to the driver, the notification control part 20b controls the notification device 13 to first notify a request for preparing for manual driving to the driver and then notifies the above-mentioned request for terminating autonomous driving to the driver. That is, the driver is requested to establish conditions for preparing for manual driving. This will be further explained with reference to FIG. 6.

In the embodiment according to the present disclosure, the notification control part 20b, as shown in FIG. 6, sets a timing tRP a predetermined second interval dt2 before the notification timing for termination request tRT as a notification timing for preparation request, and notifies the request for preparing for manual driving to the driver when the notification timing for preparation request tRP has arrived. In other words, when the vehicle V arrives at a position PRP corresponding to the notification timing for preparation request tRP, the notification control part 20b notifies the request for preparing for manual driving to the driver.

In the embodiment according to the present disclosure, the conditions for preparing for manual driving include at least a hands-on condition. The hands-on condition includes, for example, a condition of the driver placing his or her hand(s) on the steering wheel STR, a condition of the driver gripping the steering wheel STR, etc. In another embodiment (not shown), the conditions for preparing for manual driving include, in addition to the hands-on condition, a condition of the driver placing his or her foot on the brake pedal, a condition in which the gaze of the driver is directed to the front of the vehicle, etc.

A request for preparing for manual driving is notified for example in the same way as a request for terminating autonomous driving. That is, in one example, the display such as the meter display 13a1, heads up display 13a2, or center display 13a3 displays the text information such as "please prepare for manual driving". In another example, the speakers 13b are made to emit voice information "please prepare for manual driving". In still another example, the above text information and voice information are given to the driver overlappingly.

Further, the request for preparing for manual driving is notified, in one example, from when the notification timing for preparation request tRP arrives to when the notification timing for termination request tRT arrives. In another example, the request for preparing for manual driving is notified from when the notification timing for preparation request tRP arrives to when a predetermined constant time period elapses. In still another example, the request for preparing for manual driving is notified from when the notification timing for preparation request tRP arrives to when the driver establishes conditions for preparing for manual driving. In this case, a sensor is provided for detecting that the driver has established conditions for preparing for manual driving. This sensor includes, for example, a steering wheel touch sensor detecting that the driver is in a hands-on condition.

In this way, in the embodiment according to the present disclosure, the request for preparing for manual driving is notified to the driver before the request for terminating autonomous driving is notified to the driver. If the driver is in a condition for preparing for manual driving when the request for terminating autonomous driving is notified, the driver can quickly terminate autonomous driving and start manual driving.

Further, the request for preparing for manual driving does not request for terminating autonomous driving to the driver. That is, the driver can establish conditions for preparing for manual driving while continuing autonomous driving. Therefore, the driver is limited from feeling bothered.

In this way, the request for preparing for manual driving requests the driver to establish conditions for preparing for manual driving while the driver is continuing with autonomous driving. Therefore, the request for preparing for manual driving completely differs in nature from the request for terminating autonomous driving which requests for terminating autonomous driving.

In this regard, the conditions for preparing for manual driving include, for example, the hands-on condition in which the driver grips the steering wheel, as explained above. On the other hand, during autonomous driving, the driver can be in a condition taking off his or her hands from the steering wheel, that is, can take a hands-off condition.

Figure 7:
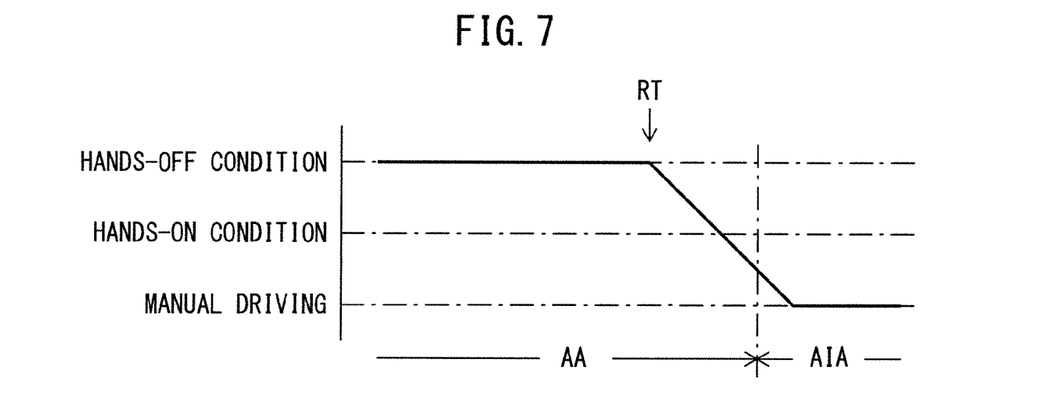
FIG. 7 is a schematic view showing changes along with time in a state of a driver in a case where no request for preparing for manual driving is notified.
Figure 8:
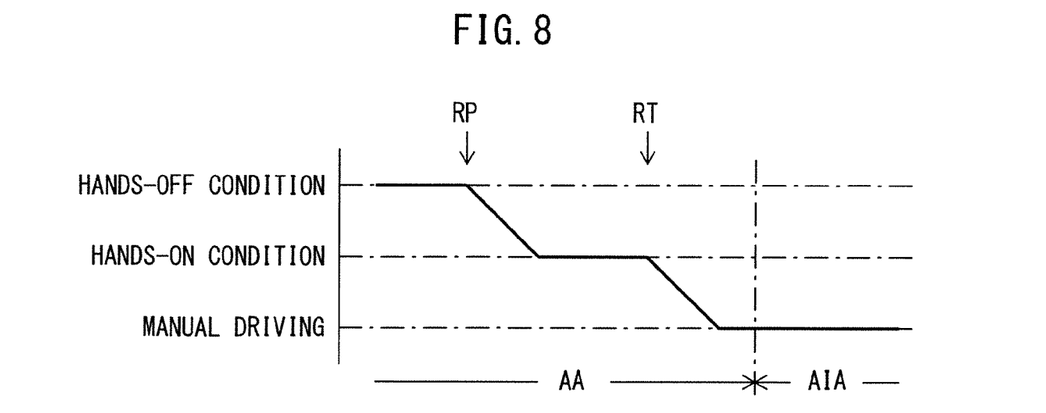
FIG. 8 is a schematic view showing changes along with time of a state of a driver in an embodiment according to the present disclosure.

FIG. 7 and FIG. 8 schematically show changes along with time in conditions of the driver. FIG. 7 shows a case where a request for terminating autonomous driving RT is notified without a request for preparing for manual driving being notified when autonomous driving is in process and the driver is in a hands-off condition. In this case, the condition of the driver changes from the hands-off condition to a manual driving condition. In the example shown in FIG. 7, manual driving is started after the vehicle V enters the areas inappropriate for autonomous driving AIA, which is not preferred.

As opposed to this, FIG. 8 shows a case of the embodiment according to the present disclosure, that is, a case where a request for preparing for manual driving RP is first notified and then a request for terminating autonomous driving RT is notified when autonomous driving is in process and the driver is in a hands-off condition. In this case, the condition of the driver changes from the hands-off condition to the hands-on condition, that is, a condition for preparing for manual driving, and then changes from the hands-on condition to the manual driving condition. In the example shown in FIG. 8, manual driving is started right before the vehicle V reaches the area inappropriate for autonomous driving AIA. In this way, in the embodiment according to the present disclosure, the condition of the driver is switched from the hands-off condition, that is, the autonomous driving condition, through the hands-on condition, that is, the condition for preparing for manual driving, to the manual driving condition. Such a technical idea has not existed up to now.

Figure 9:
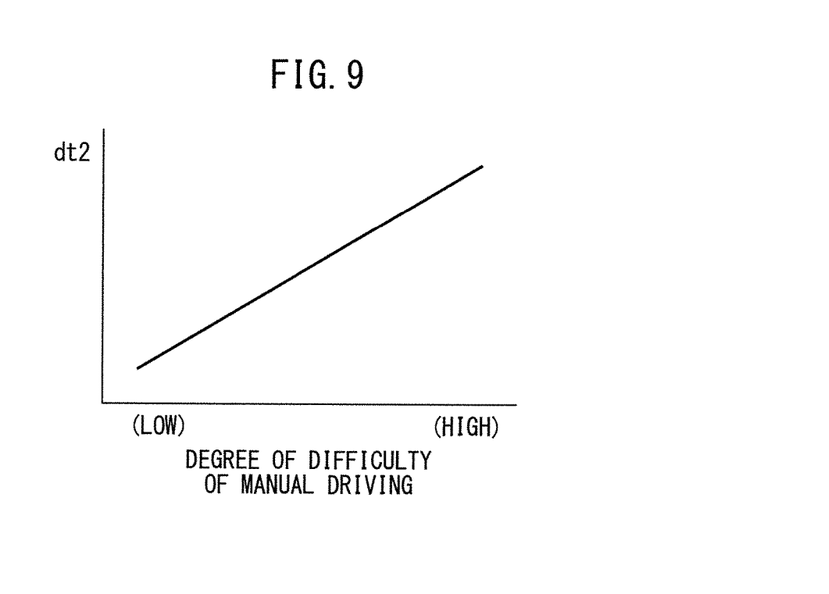
FIG. 9 is a view showing a map of a second interval.
Figure 10:
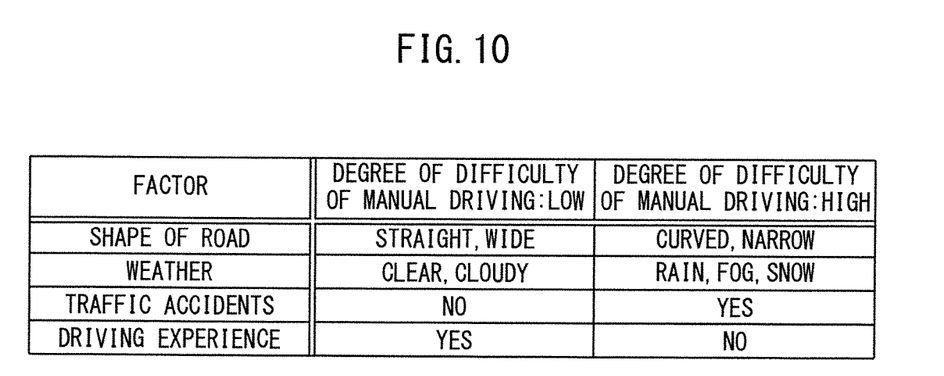
FIG. 10 is a view explaining relationships between various factors and a degree of difficulty of manual driving.

Next, several examples of calculation of the second interval dt2 explained with reference to FIG. 6, will be explained. In a first example of calculation, the notification control part 20b calculates the second interval dt2 in accordance with a degree of difficulty of manual driving in the area inappropriate for autonomous driving AIA through which the vehicle V is to be driven. Specifically, as shown in FIG. 9, when the degree of difficulty of manual driving in the area inappropriate for autonomous driving AIA is high, compared with when the degree of difficulty of manual driving is low, the second interval dt2 is made longer. In this case, the notification control part 20b finds the degree of difficulty of manual driving in the following way, for example. That is, as shown in FIG. 10, if the road in the area inappropriate for autonomous driving AIA is curved in shape, compared with if the road is straight in shape, the degree of difficulty of manual driving is higher. Alternatively, if the road width in the area inappropriate for autonomous driving AIA is narrow, compared with if the road width is broad, the degree of difficulty of manual driving is higher. Alternatively, if the weather at the area inappropriate for autonomous driving AIA is rain, fog, or snow, compared with if the weather is clear or cloudy, the degree of difficulty of manual driving is higher. Alternatively, if a traffic accident has occurred in the area inappropriate for autonomous driving AIA, compared with if no traffic accident has occurred at the area inappropriate for autonomous driving AIA, the degree of difficulty of manual driving is higher. Alternatively, if the driver has no experience with driving through the area inappropriate for autonomous driving AIA, compared with if the driver has experience with driving through the area inappropriate for autonomous driving AIA, the degree of difficulty of manual driving is higher. That is, in the first example of calculation, if the degree of difficulty of manual driving in the area inappropriate for autonomous driving AIA is higher, the notification timing of notification tRP of a request for preparing for manual driving is made earlier. Therefore, the driver can more sufficiently prepare for manual driving. Further, if the degree of difficulty of manual driving in the area inappropriate for autonomous driving AIA is low, the notification timing tRP of a request for preparing for manual driving is delayed, and therefore the driver is further limited from feeling bothered.

In a second example of calculation, the notification control part 20b calculates the second interval dt2 in accordance with a state quantity of the driver acquired by the driver's state quantity acquiring device 10. In the embodiment according to the present disclosure, the state quantity of the driver acquired by the driver's state quantity acquiring device 10 represents a preparatory time which is a time period required for the driver to establish conditions for preparing for manual driving. That is, in a case where the state quantity of the driver is expressed by a degree of awakeness of the driver, if the degree of awakeness of the driver is low, compared to if the degree of awakeness is high, the preparatory time is longer. Alternatively, in a case where the state quantity of the driver is expressed by trend in gaze allocation of the driver, for example, if a ratio of time during which the gaze of the driver is directed to the front of the vehicle is low, compared to if the ratio of time is high, the preparatory time is longer. Alternatively, in a case where the state quantity of the driver is expressed by a duration time of autonomous driving, if the duration time of the autonomous driving is long, compared with if the duration time of autonomous driving is short, the preparatory time is longer.

Therefore, in the second example of calculation, if the preparatory time period is long, compared to if the preparatory time period is short, the second interval dt2 is made longer. That is, in a case where the state quantity of the driver is expressed by the degree of awakeness of the driver, if the degree of awakeness of the driver is low, compared with if the degree of awakeness is high, the second interval dt2 is made longer. Alternatively, in a case where the state quantity of the driver is expressed by trend in gaze allocation of the driver, for example, if a ratio of time during which the gaze of the driver is directed to the front of the vehicle is low, compared to if the ratio of time is high, the second interval dt2 is made longer. Alternatively, in a case where the state quantity of the driver is expressed by a duration time of autonomous driving, if the duration time of autonomous driving is long, compared with if the duration time of autonomous driving is short, the second interval dt2 is made longer. As a result, the driver can reliably establish conditions for preparing for manual driving from when a request for preparing for manual driving is notified to when a request for terminating autonomous driving is notified while the driver is limited from feeling bothered.

In a third example of calculation, the notification control part 20b calculates the second interval dt2 in accordance with the degree of difficulty of manual driving in the area inappropriate for autonomous driving AIA and the state quantity of the driver. That is, if the degree of difficulty of manual driving is higher and the preparatory time is longer, compared with if the degree of difficulty of manual driving is lower and the preparatory time is shorter, the second interval dt2 is made longer.

Figure 11:
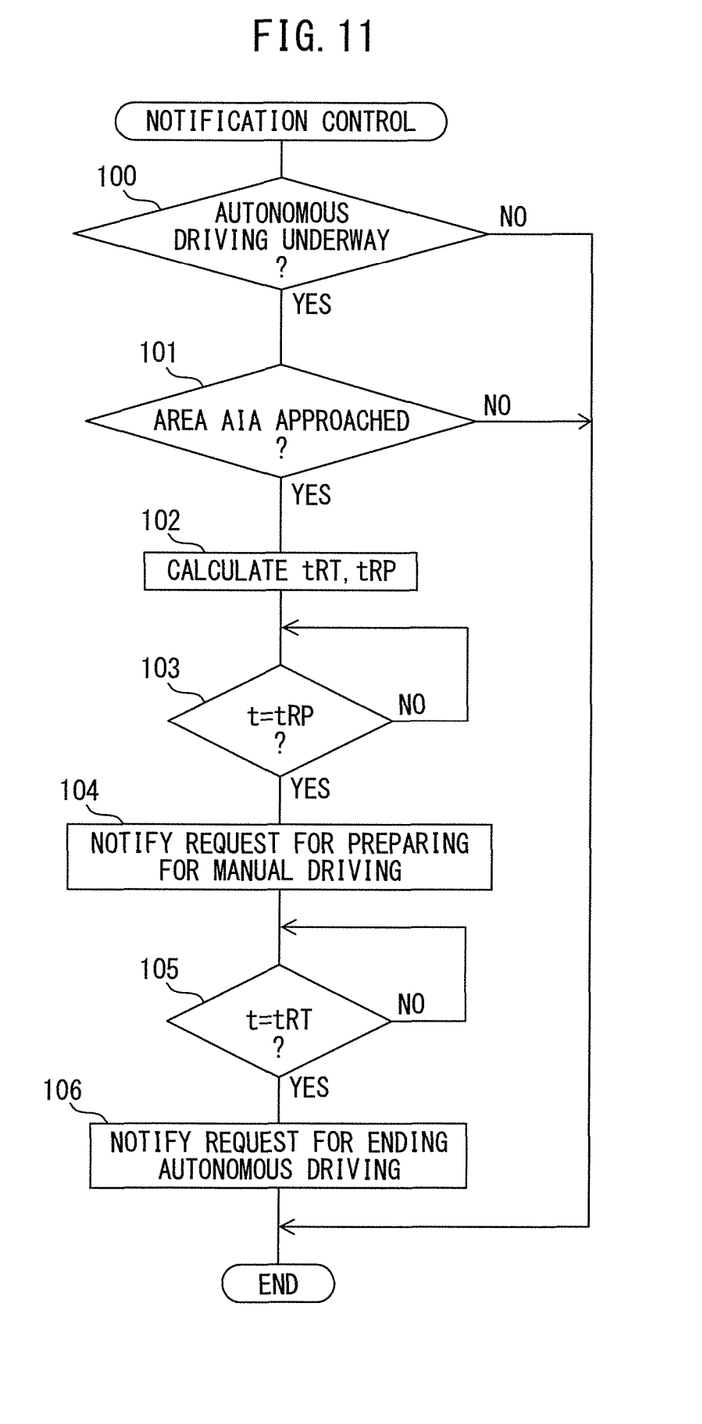
FIG. 11 is a flow chart showing a notification control routine of an embodiment according to the present disclosure.

FIG. 11 shows a routine for performing the above-mentioned notification control of the embodiment according to the present disclosure. Referring to FIG. 11, at step 100, it is judged if the vehicle V is in a process of autonomous driving. If the vehicle V is not in a process of autonomous driving, that is, if it is in a process of manual driving, the processing cycle is ended. If the vehicle V is in a process of autonomous driving, next the routine proceeds to step 101 where it is judged if the vehicle V has approached an area inappropriate for autonomous driving AIA. If it is not judged that the vehicle V has approached the area inappropriate for autonomous driving AIA, the processing cycle is ended. If it is judged that the vehicle V has approached the area inappropriate for autonomous driving AIA, the routine proceeds to step 102 where the notification timing tRT for termination request and notification timing tRP for preparation request are calculated. At the next step 103, it is judged if the notification timing tRP for preparation request has arrived. If the notification timing tRP for preparation request has not arrived, the routine returns to step 103. If the notification timing tRP for preparation request has arrived, next the routine proceeds to step 104 where the request for preparing for manual driving is notified to the driver. At the following step 105, it is judged if the notification timing tRT for termination request has arrived. If the notification timing tRT for termination request has not arrived, the routine returns to step 105. If the notification timing tRT for termination request has arrived, next the routine proceeds to step 106 where the request for terminating autonomous driving is notified to the driver.

Figure 12:
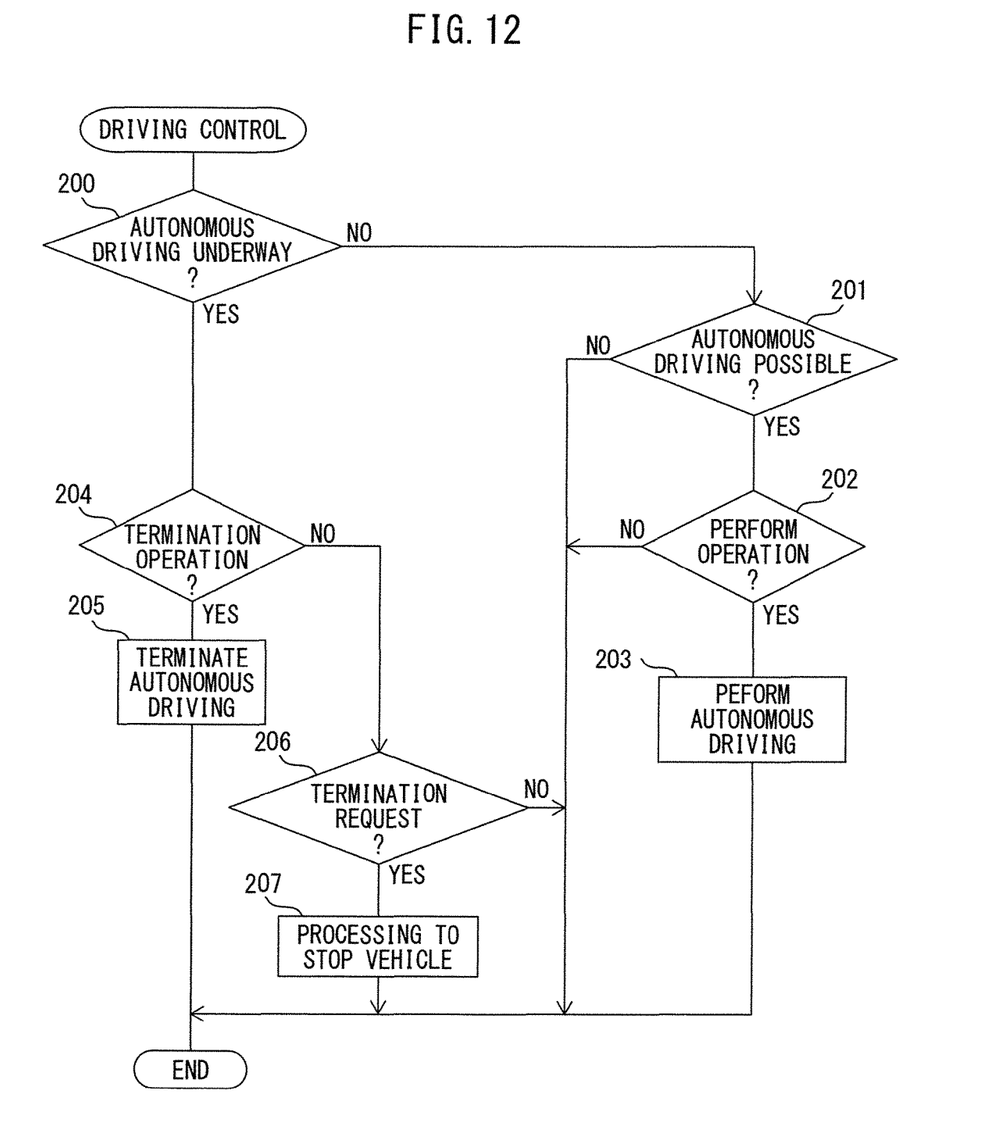
FIG. 12 is a flow chart showing an operation control routine of an embodiment according to the present disclosure.

FIG. 12 shows a routine for performing the above-mentioned driving control of the embodiment according to the present disclosure. This routine is performed by interruption every predetermined set time period. Referring to FIG. 12, at step 200, it is judged if autonomous driving is in process. If autonomous driving is not in process, that is, manual driving is in process, next the routine proceeds to step 201 where it is judged if autonomous driving is possible. If autonomous driving is not possible, the processing cycle is ended. If autonomous driving is possible, the routine next proceeds to step 202 where it is judged if the driver has operated the operation device 8 to perform autonomous driving. If the operation device 8 has not been operated, the processing cycle is ended. If the operation device 8 has been operated, next the routine proceeds to step 203 where autonomous driving is performed.

On the other hand, if autonomous driving is in process, the routine proceeds from step 200 to step 204 where it is judged if the driver has operated the operation device 8 to terminate autonomous driving. If the operation device 8 has been operated, next the routine proceeds to step 205 where the autonomous driving is terminated. That is, manual driving is started. As opposed to this, if the operation device 8 has not been operated, the routine proceeds from step 204 to step 206 where it is judged if the request for terminating autonomous driving has been notified to the driver. If no request for terminating autonomous driving is notified, the processing cycle is ended. If the request for terminating autonomous driving is notified, that is, if the driver has not operated the operation device 8 despite the request for terminating autonomous driving having been notified, the routine next proceeds to step 207 where processing for stopping the vehicle is performed. Note that, in the embodiment according to the present disclosure, if the driver does not operate the operation device 8 despite a certain time period having elapsed from when the request for terminating autonomous driving was notified, processing for stopping the vehicle is performed.

Figure 13:
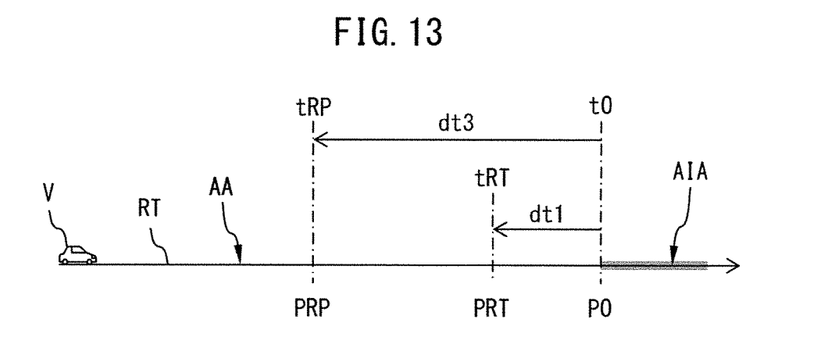
FIG. 13 is a schematic view of a running condition of a vehicle in another embodiment according to the present disclosure.

FIG. 13 shows another embodiment according to the present disclosure. In the embodiment shown in FIG. 13, the notification control part 20b sets a timing tRP a predetermined third interval before the timing t0 when the vehicle V will reach the area inappropriate for autonomous driving AIA as the notification timing for preparation request, and notifies the request for preparing for manual driving to the driver when the notification timing for preparation request tRP arrives.

The notification control part 20b calculates the third interval dt3, for example, in the same way as the second interval dt2. That is, in one example, the third interval dt3 is calculated in accordance with the degree of difficulty of manual driving in the area inappropriate for autonomous driving AIA through which the vehicle V is going to run. In another example, the third interval dt3 is calculated in accordance with the state quantity of the driver. In still other example, the third interval dt3 is calculated in accordance with the degree of difficulty of manual driving in the area inappropriate for autonomous driving AIA and the state quantity of the driver.

In the embodiment shown in FIG. 13 as well, it is possible for the driver to reliably establish conditions for preparing for manual driving from when the request for preparing for manual driving is notified to when the request for terminating autonomous driving is notified, while limiting the driver from feeling bothered.

Figure 14:
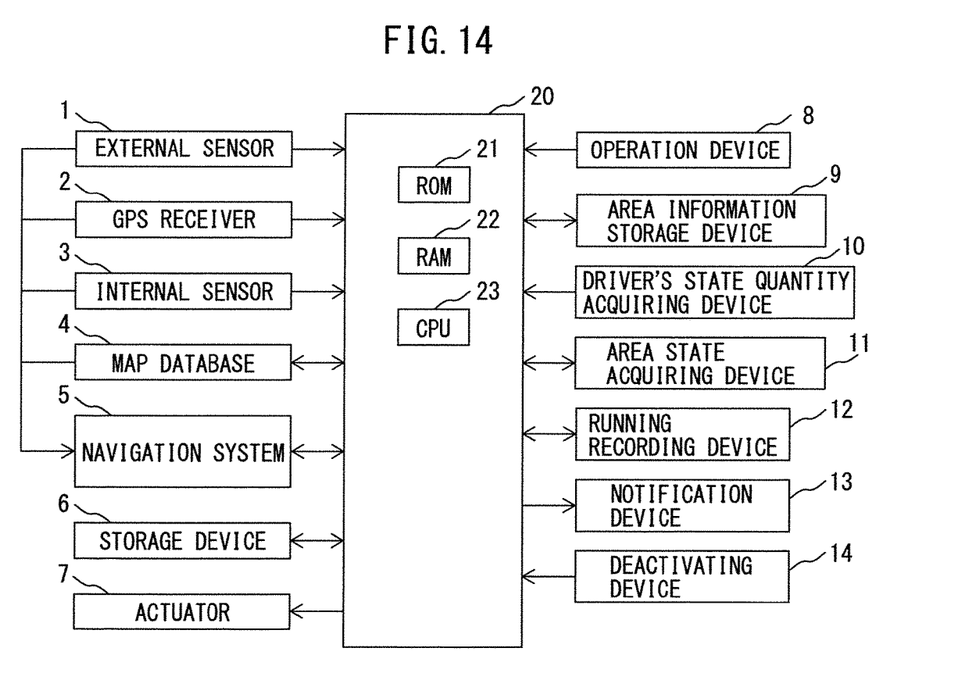
FIG. 14 is a block diagram of a control system for an autonomous driving vehicle in still another embodiment according to the present disclosure.

FIG. 14 shows still another embodiment according to the present disclosure. In the embodiment shown in FIG. 14, the control system for an autonomous driving vehicle further comprises a deactivating device 14 configured to be operated by the driver of the vehicle. The deactivating device 14 is provided with, for example, at least one of an operation button, switch, lever, touch panel, and voice recognition device (microphone). A signal indicating that the deactivating device 14 has been operated is sent to the electronic control unit 20. The electronic control unit 20 in the embodiment shown in FIG. 14 is also provided with a driving control part 20a and a notification control part 20b, similar to the electronic control unit 20 in the embodiment shown in FIG. 1.

In the embodiments according to present disclosure explained above, if the driver should be requested to terminate autonomous driving during autonomous driving, the driver is always first notified of a request for preparing for manual driving then is notified of a request for terminating autonomous driving. As opposed to this, in the embodiment shown in FIG. 14, if the driver should be requested to terminate autonomous driving during autonomous driving after the driver operates the deactivating device 14, the notification control part 20b notifies the driver of a request for terminating autonomous driving without notifying the driver of a request for preparing for manual driving. On the other hand, until the driver operates the deactivating device 14, the notification control part 20b notifies the driver of a request for preparing for manual driving and request for terminating autonomous driving.

Whether the driver can quickly start manual driving when a request for terminating autonomous driving operation is notified to the driver depends on the skill and proficiency of the driver. Therefore, if a request for preparing for manual driving is notified to a driver who can quickly start manual driving, the driver may feel bothered. In the embodiment shown in FIG. 14, in such a case, the driver can deactivate notification of a request for preparing for manual driving and, therefore, it is possible to limit the driver from feeling bothered.

Note that, in the embodiment shown in FIG. 14, when the notification of a request for preparing for manual driving is deactivated, if the deactivating device 14 is operated again by the drive, notification of a request for preparing for manual driving is again activated. Therefore, it is possible to switch between activation and deactivation of notification of a request for preparing for manual driving depending on, for example, drivers.

Figure 15:
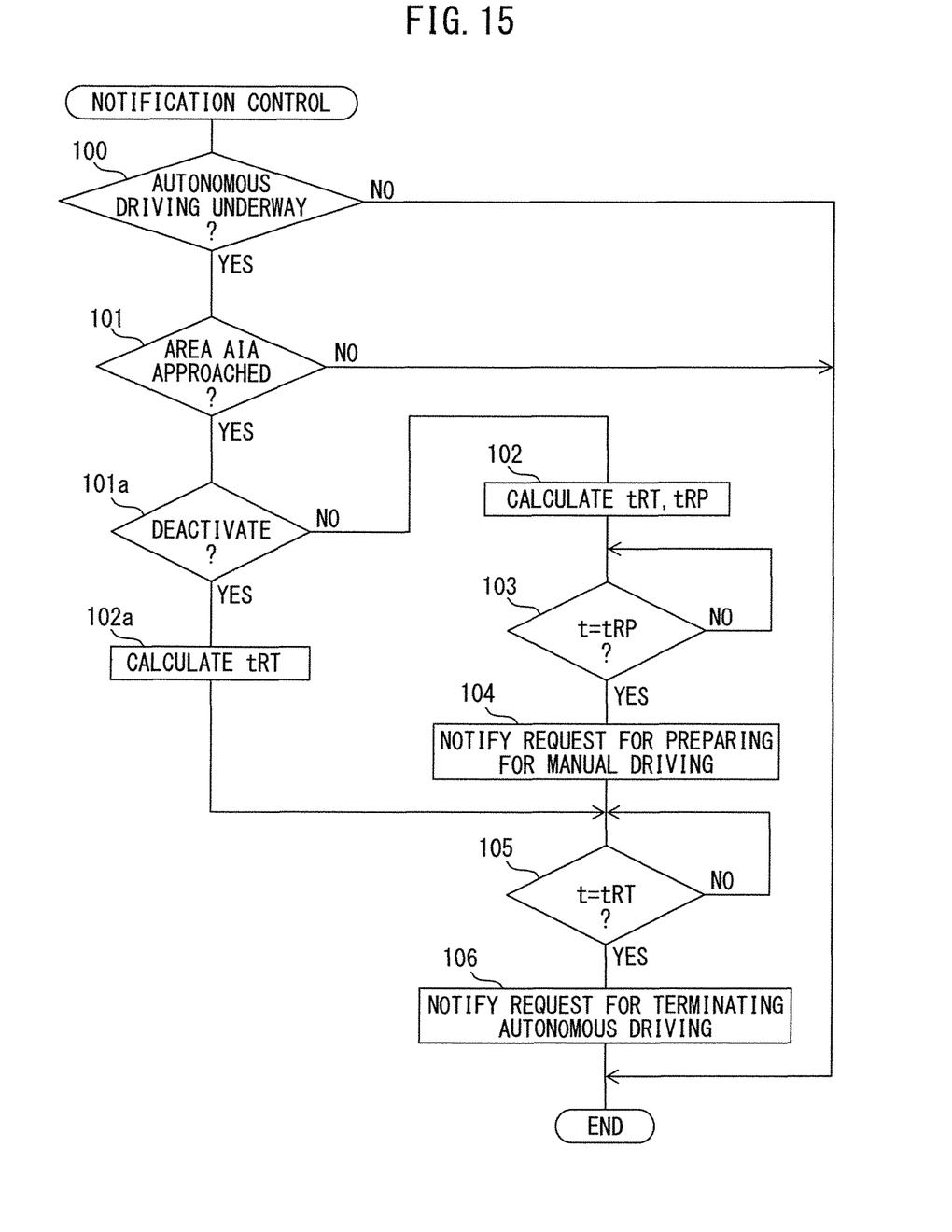
FIG. 15 is a flow chart showing a notification control routine in still another embodiment according to the present disclosure.

FIG. 15 shows a routine for performing control for notification of the embodiment shown in FIG. 14. Below, differences between the routine shown in FIG. 15 and the routine shown in FIG. 11 will be explained. If, at step 101, it is judged that the vehicle V has approached an area inappropriate for autonomous driving AIA, next, the routine proceeds to step 101a where it is judged whether notification of a request for preparing for manual driving should be deactivated. If notification of a request for preparing for manual driving should not be deactivated, next, the routine proceeds to step 102. On the other hand, if the notification of a request for preparing for manual driving should be deactivated, next the routine proceeds to step 102a where the notification timing for termination request tRT is calculated. Next, the routine jumps to step 105.

Note that, in the embodiment shown in FIG. 14, the operation device 8 and the deactivating device 14 are mutually different devices. However, so long as it is possible to discriminate between when the operation by the driver is an operation for deactivating notification of a request for preparing for manual driving or an operation for terminating or starting autonomous driving, the operation device 8 and the deactivating device 14 may be the same devices as each other.

It is possible to limit the driver from feeling bothered while enabling the driver to more quickly start manual driving.

While the present disclosure has been described by reference to specific embodiments chosen for purposes of illustration, it should be apparent that numerous modifications could be made thereto, by those skilled in the art, without departing from the basic concept and scope of the present disclosure.

What is claimed is:

1. A control system for an autonomous driving vehicle, comprising:
an operation device configured to be operated by a driver;
a notification device configured to give notification to the driver; and
an electronic control unit comprising:
a driving control part configured to perform autonomous driving, and to terminate autonomous driving and switch vehicle driving to manual driving when the driver operates the operation device during autonomous driving; and
a notification control part configured to control the notification device to first notify a request for preparing for manual driving to the driver which requests that the driver establish conditions for preparing for manual driving while autonomous driving continues and then notify a request for terminating autonomous driving to the driver when the driver should be requested to terminate autonomous driving during autonomous driving.

2. The control system for an autonomous driving vehicle according to claim 1, wherein the notification control part is configured to notify the request for terminating autonomous driving to the driver a predetermined first interval before a timing when the vehicle will arrive at a predetermined area inappropriate for autonomous driving.

3. The control system for an autonomous driving vehicle according to claim 2, wherein the notification control part is configured to notify the request for preparing for manual driving to the driver a predetermined second interval before the timing of notifying the request for terminating autonomous driving to the driver.

4. The control system for an autonomous driving vehicle according to claim 3, wherein the notification control part is configured to calculate the second interval in accordance with a degree of difficulty of manual driving in the area inappropriate for autonomous driving.

5. The control system for an autonomous driving vehicle according to claim 3, further comprising a driver's state quantity acquiring device configured to acquire a state quantity of the driver,
    wherein the notification control part is configured to calculate the second interval in accordance with the state quantity of the drive acquired by the driver's state quantity acquiring device.

6. The control system for an autonomous driving vehicle according to claim 1, wherein the notification control part is configured to notify the request for preparing for manual driving to the driver a predetermined third interval before a timing when the vehicle will arrive at a predetermined area inappropriate for autonomous driving.

7. The control system for an autonomous driving vehicle according to claim 6, wherein the notification control part is configured to calculate the third interval in accordance with a degree of difficulty of manual driving in the area inappropriate for autonomous driving.

8. The control system for an autonomous driving vehicle according to claim 6, further comprising a driver's state quantity acquiring device configured to acquire a state quantity of the driver,
    wherein the notification control part is configured to calculate the third interval in accordance with the state quantity of the driver acquired by the driver's state quantity acquiring device.

9. The control system for an autonomous driving vehicle according to claim 1, further comprising a deactivating device configured to be operated by the driver,
    wherein the notification control part is configured to control the notification device to notify the request for terminating autonomous driving to the driver without notifying the request for preparing for manual driving to the driver if the driver should be requested to terminate autonomous driving during autonomous driving after the driver operates the deactivating device.

10. The control system for an autonomous driving vehicle according to claim 1, wherein the request for preparing for manual driving does not request terminating autonomous driving to the driver.

11. A control method of an autonomous driving vehicle comprising:
    an operation device configured to be operated by a driver;
    a notification device configured to give notification to the driver; and
    an electronic control unit,
    the control method including a step of performing autonomous driving, and terminating autonomous driving and switching vehicle driving to manual driving when the driver operates the operation device during autonomous driving, using the electronic control unit,
    the control method further including a step of controlling the notification device to first notify a request for preparing for manual driving to the driver which requests that the driver establish conditions for preparing for manual driving while autonomous driving continues and then notify a request for terminating autonomous driving to the driver when the driver should be requested to terminate autonomous driving during autonomous driving, using the electronic control unit.

12. The control method of an autonomous driving vehicle according to claim 11, wherein the request for preparing for manual driving does not request terminating autonomous driving to the driver.

* * * * *